C. G. DE LAVAL.
TURBINE METER.
APPLICATION FILED AUG. 13, 1915.
1,235,559.
Patented Aug. 7, 1917.
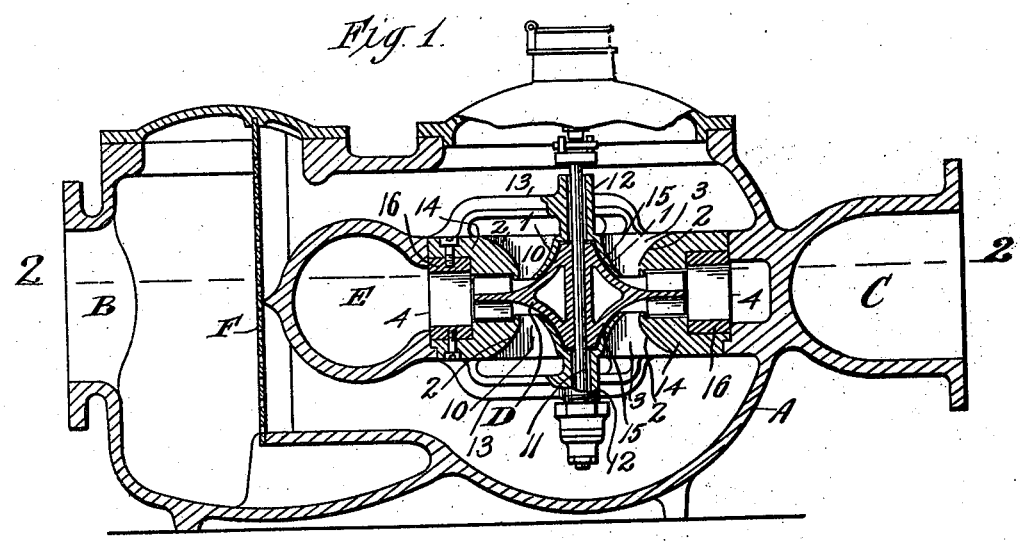

UNITED STATES PATENT OFFICE.

CARL GEORGE DE LAVAL, OF ORANGE, NEW JERSEY, ASSIGNOR TO HENRY R. WORTHINGTON, OF NEW YORK, N. Y., A CORPORATION OF NEW JERSEY.

TURBINE-METER.

1,235,559.  Specification of Letters Patent.  Patented Aug. 7, 1917.

Application filed August 13, 1915. Serial No. 45,272.

*To all whom it may concern:*

Be it known that I, CARL GEORGE DE LAVAL, a citizen of the United States, residing at Orange, county of Essex, and State of New Jersey, have invented certain new and useful Improvements in Turbine-Meters, fully described and represented in the following specification and the accompanying drawings, forming a part of the same.

This invention relates to liquid meters of that class known as turbine meters in which the liquid acts to rotate a vane wheel, the especial object of the invention being to provide an improved construction by which uniformity and accuracy of registration shall be secured with varying amounts of liquid passing through the meter.

It is found in practice that previous meters of this class are liable to irregularities in registration on different flows, so that, although accurate registration is secured on some flows, the meter will register inaccurately on other flows, this difficulty arising especially in the registering of small flows. I have discovered that this difficulty can be avoided and accurate registration secured on widely varying flows by the use of stationary guiding nozzles on the wheel inlets or inlet, by which the water is guided into the wheel in such a manner that no eddies or counter currents are set up and regularity of flow to the wheel secured on both small and large streams, and that a still better action is secured by using, in addition to these inlet nozzles, a diffuser having a series of radial or curved diffusing vanes on the outlet, to which the liquid passes from the wheel. The invention consists in these features and certain constructions and combinations of parts embodying the same.

For a full understanding of the invention, a detailed description of a construction embodying all the features of the same in their preferred form will now be given in connection with the accompanying drawing, and the invention then specifically pointed out in the claims.

In the drawings—

Figure 1 is a vertical section of the meter on the line 1—1 of Fig. 2;

Fig. 2 is a horizontal section on the line 2—2 of Fig. 1.

Referring to the drawings, the meter shown is the same in general construction and operation as that of United States Letters Patent to Sims, No. 1,133,408, dated March 30, 1915, except as modified to embody the present invention, and reference may be had to said Letters Patent No. 1,133,408, and to United States Letters Patent to Ray, No. 1, 005,875, dated October 17, 1911, for a full description of the construction and operation of such turbine meters.

In the meter shown, A is the meter casing; B the inlet; C the outlet, and D the meter wheel surrounded by the volute delivery E terminating in outlet C. The liquid passes to the wheel from casing A through inlets 10 above and below the wheel, and from inlet B to casing A above and below the volute E through vertical strainer F. The meter wheel D is fixed on shaft 11, which operates the counter through registering mechanism of any suitable form, this shaft 11 being shown as mounted in bearings 12 carried by arms 13 on the top and bottom plates 14 which form the opposite walls of the wheel chamber, and through which are the central openings 10.

Referring now to the features especially embodying the present invention, the inlets 10 are formed with an interior stationary guide-piece 15 having a curved surface 1 by which the liquid is directed outward to the vanes of the wheel D, and the opposing wall 2 of the inlet 10 is preferably curved so as to form with the surface 1 a contracting nozzle through which the liquid passes to wheel D. Each of the nozzles preferably is divided by a series of stationary vanes 3, four being shown, although this number may be varied, which also aid in securing the desired regularity of flow to the wheel. These vanes are shown as straight radial vanes, but it will be understood that their form may be varied. Preferably, and as shown, these vanes are formed integral with the plates 14 and bearings 12, so as to support the latter, and it will be understood that, with the vanes 3 thus supporting the bearings 12 from plates 14, the arms 13 may be omitted, which in some cases may be desirable for a freer flow of the liquid to the wheel.

The diffusion vanes preferably used are shown as curved vanes 4 carried by top and bottom plates 16 set into plates 14 to form a diffusion ring between the wheel D and volute E, so that the water leaving the wheel passes between these vanes and the whirling motion is taken out of the liquid and velocity converted into pressure, and thus the water is delivered to the volute E more smoothly and uniformly, thus aiding in securing accuracy of registration on varying flows. The curved vanes shown are preferred, but straight radial vanes, or diffusing vanes of other form, may be used.

The invention secures a more regular and uniform flow of the liquid through the meter on varying streams, and thus avoids the irregularities in registration incident to previous meters. The stationary guiding surface avoids the whirling motion imparted to the liquid by the wheel hub or similar guides carried by the wheel, and the nozzle construction and dividing vanes aid in securing the uniformity of action on varying streams desired.

While the invention has been shown and described as applied to a double inlet wheel, that is, a wheel having inlets at opposite sides, and this is the preferred construction, it will be understood that the broader features of the invention are applicable also in connection with meters of this class in which the water is admitted to the wheel on only one side, as, for instance, in the Ray Patent No. 1,005,875. It will be understood, also, that the invention is not limited to turbine meters of the particular form shown, but may be applied to other turbine meters.

What is claimed is:

1. In a turbine meter, the combination with a meter wheel having an axial inlet and radial discharge, of an annular nozzle for directing the incoming liquid to the wheel and constructed to deliver the liquid radially outward to the wheel vanes, stationary vanes dividing the nozzle space, and a diffuser to which the wheel delivers.

2. In a turbine meter, the combination with a meter wheel having an axial inlet and radial discharge, of a stationary annular nozzle within the inlet having its guiding surfaces curved to deliver the liquid radially outward to the wheel vanes, diffusion vanes to which the wheel delivers, and a diffusion volute outside the diffusion vanes.

3. In a turbine meter, the combination with a meter wheel having an axial inlet at each side of the wheel and radial discharge, of an annular nozzle for directing the incoming liquid to the wheel and constructed to deliver the liquid radially outward to the wheel vanes, stationary vanes dividing the nozzle space, and a diffuser to which the wheel delivers.

4. In a turbine meter, the combination with a meter wheel having an axial inlet at each side of the wheel and radial discharge, of a stationary annular nozzle within each inlet having its guiding surfaces curved to deliver the liquid radially outward to the wheel vanes, diffusion vanes to which the wheel delivers, and a diffusion volute outside the diffusion vanes.

In testimony whereof, I have hereunto set my hand in the presence of two subscribing witnesses.

CARL GEORGE de LAVAL.

Witnesses:
C. T. HEDDER,
W. J. FRITCHMAN.

Copies of this patent may be obtained for five cents each, by addressing the "Commissioner of Patents, Washington, D. C."